United States Patent
Gopukumar et al.

(10) Patent No.: US 9,985,277 B2
(45) Date of Patent: May 29, 2018

(54) PROCESS FOR THE PREPARATION OF HIGH VOLTAGE NANO COMPOSITE CATHODE (4.9VV) FOR LITHIUM ION BATTERIES

(75) Inventors: Sukumaran Gopukumar, Tamil Nadu (IN); Chandrasekaran Nithya, Tamil Nadu (IN); Ramasamy Thirunakaran, Tamil Nadu (IN); Arumugam Sivashanmugam, Tamil Nadu (IN)

(73) Assignee: Council of Scientific & Industrial Research, New Delhi (IN)

( * ) Notice: Subject to any disclaimer, the term of this patent is extended or adjusted under 35 U.S.C. 154(b) by 202 days.

(21) Appl. No.: 13/880,704

(22) PCT Filed: Mar. 30, 2011

(86) PCT No.: PCT/IB2011/000673
§ 371 (c)(1),
(2), (4) Date: Jul. 1, 2013

(87) PCT Pub. No.: WO2012/052811
PCT Pub. Date: Apr. 26, 2012

(65) Prior Publication Data
US 2013/0277619 A1 Oct. 24, 2013

(30) Foreign Application Priority Data

Oct. 20, 2010 (IN) .......................... 2495/DEL/2010

(51) Int. Cl.
*H01B 1/06* (2006.01)
*H01M 4/36* (2006.01)
(Continued)

(52) U.S. Cl.
CPC ............. *H01M 4/364* (2013.01); *C01B 25/45* (2013.01); *C01B 32/05* (2017.08); *H01M 4/366* (2013.01);
(Continued)

(58) Field of Classification Search
CPC .......... H01M 4/48; H01M 4/62; H01M 4/366; H01M 4/1391; C01B 25/45
(Continued)

(56) References Cited

U.S. PATENT DOCUMENTS

2009/0130559 A1* 5/2009 Okada et al. ................. 429/224
2009/0130560 A1 5/2009 Exnar et al.
(Continued)

FOREIGN PATENT DOCUMENTS

CA 2719017 A1 * 12/2009 ........... C01B 25/375
JP 2008-130525 * 6/2008 ............ H01M 4/58

OTHER PUBLICATIONS

Surendra&EMSP14;K. Martha et al: "LiMn 0.8 Fe 0.2 PO 4 : An Advanced Cathode Material for Rechargeable Lithium Batteries", Angewandte Chemie International Edition, vol. 48, No. 45, Oct. 26, 2009 (Oct. 26, 2009), pp. 8559-8563, XP55009549, ISSN:1433-7851, DOI: 10.1002/anie.200903587.
(Continued)

*Primary Examiner* — Khanh Tuan Nguyen
(74) *Attorney, Agent, or Firm* — Locke Lord LLP

(57) ABSTRACT

An olivine structured nano-composite $LiM_xMn_{1-x}PO_4/C$ was synthesized by a sol-gel assisted high energy ball mill method and the synthesis method does not require any inert atmosphere. Electrochemical cycling studies were carried out between 3.0-4.6V using 1M $LiPF_6$ in 1:1 EC/DEC as electrolyte. The charge/discharge cycling studies of the nano-composite exhibit an average discharge capacity of 158 mAh/g at 0.1 C rate over the investigated 50 cycles.

10 Claims, 4 Drawing Sheets

(51) Int. Cl.
*C01B 25/45* (2006.01)
*H01M 4/58* (2010.01)
*H01M 4/62* (2006.01)
*C01B 32/05* (2017.01)
*H01M 4/136* (2010.01)

(52) U.S. Cl.
CPC ......... *H01M 4/5825* (2013.01); *H01M 4/625* (2013.01); *H01M 4/136* (2013.01)

(58) Field of Classification Search
USPC ............................ 252/506, 507; 429/53, 224
See application file for complete search history.

(56) References Cited

U.S. PATENT DOCUMENTS

2009/0197174 A1    8/2009  Levassbur et al.
2009/0286139 A1*  11/2009  Awano ........................... 429/53
2011/0012067 A1*   1/2011  Kay ...................... C01B 25/375
                                                    252/507

OTHER PUBLICATIONS

Shiratsuchi T et al: "Cathodic performance of LiMnI-xMxPO4 (M=Ti, Mg and Zr)annealed in an inert atmosphere", Electrochimica Acta, Elsevier Science Publishers, Barking, GB,vol. 54, No. 11, Apr. 15, 2009 (Apr. 15, 2009), pp. 3145-3151, XP025980942,ISSN: 0013-4686, DOI: 10.1016/J.Electacta.2008.11.069 [retrieved on Dec. 11, 2008].

Marca M.Doeff et al: "Combustionsynthesis of nanoparticulate LiMg xMnI-xPO4 ( x = 0, 0.1, 0.2)carbon composites", Journal of Materials Research, vol. 25, No. 08, Aug. 1, 2010 (Aug. 1, 2010), pp. 1460-1468, XP55009041,ISSN: 0884-2914, DOI: 10.1557/JMR.2010.0187 p. 1463-p. 1467.

Shiguang Hu Tianjing Zhang et al: "Glycine-assisted solgel synthesis of LiFePO4/C cathode materials for lithium-ion batteries", Functional Materials Letters : FML, Singapore [U.A.]: World Scientific,2008-,ID, vol. 3, No. 3, Sep. 1, 2010 (Sep. 1, 2010), pp. 217-221, XP008144014, ISSN: 1793-6047, DOI: 10.1142/S1793604710001287.

Kalaiselvin et al:"One-pot, glycine-assisted combustion synthesis and characterization of nanoporous LiFePO4/C composite cathodes for lithium-ion batteries", Journal of Power Sources, Elsevier SA, CH, vol. 195, No. 9, May 1, 2010 (May 1, 2010), pp. 2894-2899, XP026827333, ISSN: 0378-7753.

Zhihua Li et al:"Developments of lithium-ion batteries and challenges of LiFePO4 as one promising cathode material",Journal of Materials Science,Kluwer Academic Publishers, BO,vol. 44,\ No. 10, Feb. 28, 2009 (Feb. 28, 2009), pp. 2435-2443, XP019679681,ISSN: 1573-4803.

International Search Report of PCT/IB2011/000673.

* cited by examiner

PROCESS FOR THE PREPARATION OF HIGH VOLTAGE NANO COMPOSITE CATHODE (4.9VV) FOR LITHIUM ION BATTERIES

CROSS-REFERENCE TO RELATED APPLICATIONS

This application is the national phase under 35 U.S.C. § 371 of PCT International Application No. PCT/IB2011/000673, filed Mar. 30, 2011, which claims priority to Indian Application No. 2495/DEL/2010, filed Oct. 20, 2010, the entire contents of the aforementioned application is hereby incorporated herein by reference.

FIELD OF THE INVENTION

Present invention relates to a process for the preparation of high voltage (4.9V) nano-composite cathode material $LiM_xMn_{1-x}PO_4/C$ wherein M is a transition metal cation comprising Co or Ni and x varies from 0 to 0.12, synthesized by sol-gel assisted high energy ball milling method for lithium secondary batteries.

BACKGROUND OF THE INVENTION

In recent years, well-known cathode materials are lithium transition metal oxides and lithium transition metal phosphates for lithium ion batteries. Lithium transition metal phosphates have been of great interest as storage cathodes for rechargeable lithium batteries because of their high energy density, low raw material cost, environmental friendliness and safety. Among the lithium transition metal phosphates $LiFePO_4$ possesses considerable importance because of its low cost, highest reversible capacity and excellent thermal stability. However, it suffers from low electrical conductivity and low lithium ion diffusion rate. Olivine type $LiMnPO_4$ would also be of interest because of its high redox potential 4.05V Vs $Li/Li^+$, which is compatible with present day lithium cobalt oxide material. However, $LiMnPO_4$ is an insulator with 2 eV spin exchange band gap, which significantly lowers the electrochemical activity. Furthermore, this 4.05/4.1 V working potential is just below the limit of stability of the common organic electrolytes, which is used in lithium ion batteries thus allowing good cycle life without any degradation of the electrolyte in the battery.

Several groups have explored various methods to prepare electro-active $LiMnPO_4$; there are very few reports which deliver performance greater than 100 $mAhg^{-1}$. Few researchers have improved the performance of $LiMnPO_4$ by the reduction of particle size using various synthesis methods. In this way U.S. patent No. 2008/0292522 A1 discloses the polyol process which yields 5 to 50 nm particles and provides excellent electrochemical characteristics. U.S. Patent No. 2009/0130560 A1 discloses the preparation of electrochemically active $LiMnPO_4$ by sol-gel method. U.S. Patent No. 2009/0197174 A1 discloses the nano-sized crystalline $LiMnPO_4$ powder with controlled morphology by direct precipitation at low temperature. T. Shiratsuchi et al ["Cathodic performance of $LiMn_{1-x}M_xPO_4$ (M—Ti, Mg and Zr) annealed in an inert atmosphere"—T. Shiratsuchi, S. Okada, T. Doi, J. Yamaki, Electrochim. Acta 54 (2009) 3145"] and S. K. Martha et al ["$LiMnPO_4$ as an advanced cathode material for rechargeable lithium batteries"—S. K. Martha, B. Markovsky, J. Grinblat, Y. Gofer, O. Haik, E. Zinigrad, D. Aurbach, T. Drezen, D. Wang, G. Deghenghi, I. Exnar, J. Electrochem. Soc. 156 (2009) A541"] have shown improved performance of $LiMnPO_4$ by cation doping; Z. Bakenov et al ["Electrochemical Performance of nano-composite $LiMnPO_4/C$ cathode materials for lithium batteries"—Z. Bakenov, I. Taniguchi, Electrochem. Commun. 12 (2010) 75"] and S. K. Martha et al [$LiMn_{0.8}Fe_{0.2}PO_4$: An advanced cathode material for rechargeablelithium batteries"—S. K. Martha, J. Grinblat, O. Haik, E. Zinigrad, T. Drezen, J. H. Miners, I. Exnar, A. Kay, B. Markovsky, D. Aurbach, Angew. Chem. Int. Edn. 48 (2009) 8559"] reported that electrochemically active carbon composites synthesized by using inert atmosphere. To summarize the recent reports, the nano-sizing process by means of sol-gel preparation and/or subsequent calcination with carbon in an inert atmosphere seems to be the most appropriate synthesis route to improve the performance of $LiMnPO_4$.

OBJECTIVE OF THE INVENTION

The main object of the present invention is to provide a process for the preparation of high voltage (4.9V) nano-composite for lithium ion batteries Another objective of the present invention is to produce a cathode material $LiM_xMn_{1-x}PO_4$ suitable for rechargeable lithium ion battery.

Still another objective of the present invention is to provide a highly ordered olivine lithium manganese phosphate with suitable divalent cation dopant, which offers good structural stability during cycling at high voltages and makes it as a composite with carbon.

Still another objective of the present invention is to solve the conductivity problems and synthesis difficulties pertaining to $LiM_xMn_{1-x}PO_4$.

SUMMARY OF THE INVENTION

Accordingly, present invention provides a process for the synthesis of high voltage nano composite cathode material $LiM_xMn_{1-x}PO_4$ wherein M is a transition metal cation comprising of dopant Co or Ni in composite with C and x varies from 0 to 0.12 for lithium ion batteries and the said process comprising the steps of:
 i. mixing salts of lithium, manganese, dopant and ammonium dihydrogen orthophosphate in the ratio ranging between 4.1:9.8:0:4.6 to 4.1:8.8:1:4.6;
 ii. dissolving the mixture as obtained in step (i) in water in the ratio ranging between 1:1 at temperature in the range of 27-30° C.;
 iii. adding the solution as obtained in step (ii) in glycine in the ratio ranging between 1:1
 iv. heating the solution as obtained in step (iii) at temperature in the range of 60 to 75° C. for period in the range of 2 to 4 hours,
 v. drying the heated solution as obtained in step (iv) for period in the range of 10 to 12 hrs at temperature in the range of 100-120° C.
 vi. grinding and calcining the mixture as obtained in step (v) at temperature in the range of 800-850° C. for period in the range of 4 to 5 hrs in air atmosphere to obtain high voltage nano composite cathode material.

In an embodiment of the present invention, salts used are selected from acetates or nitrates.

In another embodiment of the present invention, dopants are selected from Co and Ni.

In yet another embodiment of the present invention, said process is simple and economically viable combined sol-gel ball milling technique.

In yet another embodiment of the present invention, said process does not involve inert environment.

In yet another embodiment of the present invention, dopant provides high capacity and cycling stability up to 4.9V.

In yet another embodiment of the present invention, said cathode material delivers a discharge capacity in the range of 139 to 165 mAh/g at 0.2 to 0.05 C rate.

In yet another embodiment of the present invention, said cathode material has high retention of capacity in the range of 95-98% at high rates up to 40 to 50 cycles.

DETAIL DESCRIPTION OF THE INVENTION

Figure 1:
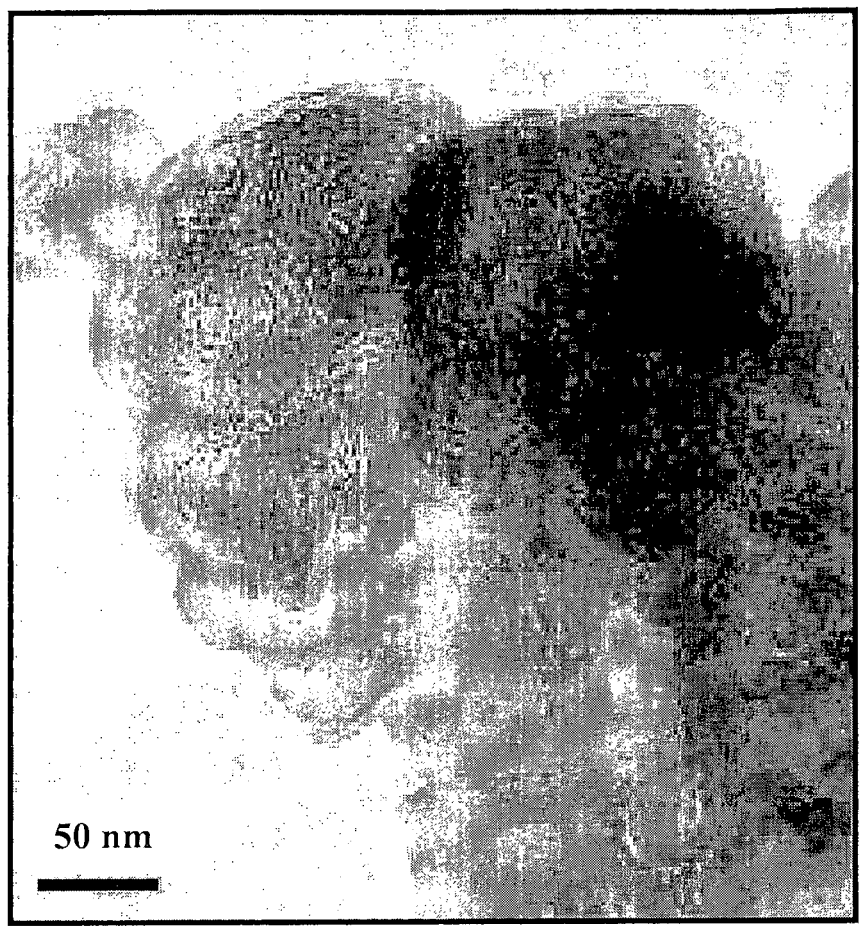
FIG. 1 represents the TEM images of $LiM_xMn_{1-x}PO_4/C$ composite

According to the present invention, the olivine composite has the general formula $$LiM_xMn_{1-x}PO_4/C$$

wherein M is a transition metal cation like Co, Ni etc., and x varies from 0 to 0.12.

The present invention relates to obtain higher capacity of the olivine lithium manganese phosphate which exhibit excellent cycleability at high voltages (4.9V) by the improvement of conductivity in the bulk. The synthesis process delivers particles of nano dimensions of the olivine material thereby reducing the diffusion path length for lithium ions and establishing a large contact area with conductive additive carbon leading to enhancement in electronic conductivity.

The sol-gel process coupled with high energy ball milling method of synthesizing divalent cation doped $LiMnPO_4/C$ have control over the structure of the material on a nano metric scale which is based on some organo-metallic precursors and the gels formed by the growth of network from an array of discrete particles or by formation of an inter connected 3-D network by the simultaneous hydrolysis and polycondensation of organometallic precursors.

Present invention provides a high voltage nano-composite cathode material (4.9V) for lithium ion batteries which comprises the divalent cation doped lithiated transition metal phosphates with pnmb space group and composite with carbon. The composite carbon additives are appeared as coating layer over the active materials.

Material of the present invention is used as cathode for lithium ion batteries. The method for construction follows a known process in the conventionally used present day lithium ion batteries. The active material is mixed with 5-10% binder and then formed into slurry to spread over the current collector. The binder and current collector are preferably polyvinylidene fluoride and aluminium foil.

EXAMPLES

The following examples are given by way of illustration of the working of the invention in actual practice and therefore should not be construed to limit the scope of the present invention.

Example 1

$LiMnPO_4/C$ $LiMnPO_4$ cathode material was synthesized by sol-gel method using glycine as a chelating agent. Stoichiometric amount of acetate salts of lithium (10.202 g), manganese (24.509 g) and ammonium dihydrogen orthophosphate (11.503 g) were dissolved in distilled water (100 ml) at room temperature (27° C.). This mixed solution is then added to 1M glycine (7.506 g) solution. After that this solution was heated to 75° C. for 2 hours. The solution turned to transparent gel, and was dried overnight (12 hrs) at 120° C. The resulting product (7 g) was ground well and then calcined at 850° C. for 5 hrs in air atmosphere. The calcined powders are ball milled with 30 wt % of acetylene black.

Example 2

Figure 4:
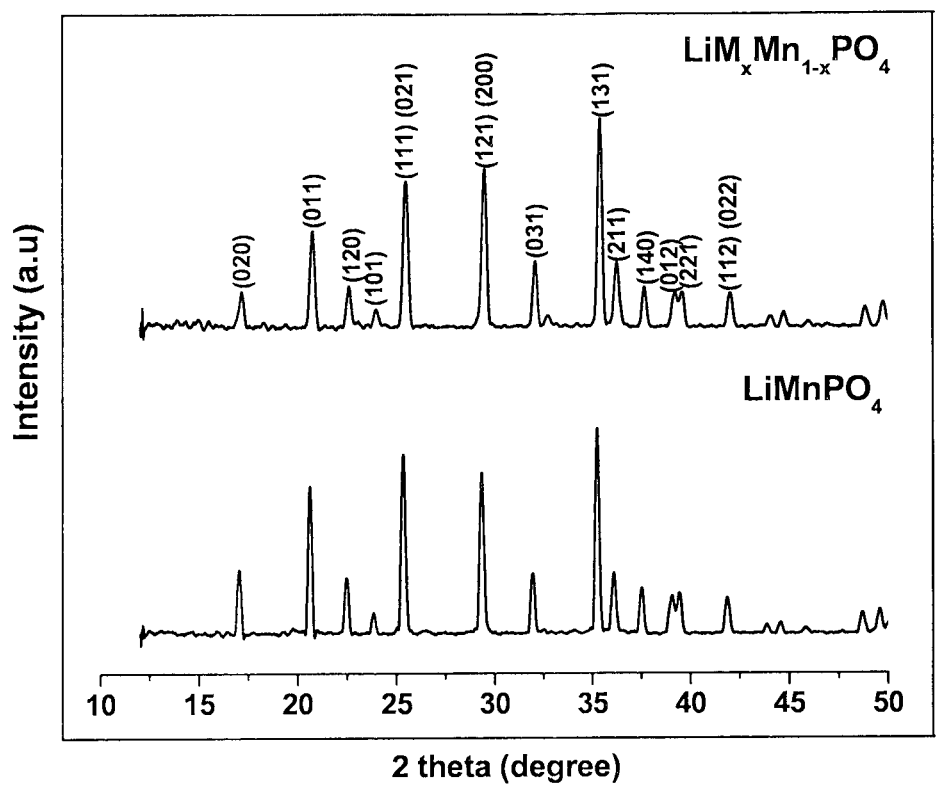
FIG. 4 represents the XRD patterns of $LiM_xMn_{1-x}PO_4/C$ composites.

$LiCo_{0.11}Mn_{0.89}PO_4/C$ $LiM_xMn_{1-x}PO_4$ cathode materials were synthesized by sol-gel method using glycine as a chelating agent. Stoichiometric amount of acetate salts of lithium (10.20 g), manganese (22.0581 g) and the Cobalt (2.491 g) dopant along with ammonium dihydrogen orthophosphate (11.503 g) were dissolved in distilled water (100 ml) at room temperature (27° C.). This mixed solution is then added to 1M glycine (7.506 g) solution. After that this solution was heated to 75° C. for 2 hours, the solution was turned to transparent gel, and the latter was dried overnight (12 hrs) at 120° C. The resulting product (6 g) was ground well and then calcined at 850° C. for 5 hrs in air atmosphere. The calcined powders are ball milled with 30 wt % of acetylene black. These particles are confirmed by matching XRD patterns (FIG. 4) for their phase purity and the crystallinity.

Each prepared positive active material was mixed with acetylene black as the conductive additive and was then dispersed in N-methyl pyrollidone with polyvinylidene fluoride dissolved in the solvent to form slurry. The weight ratios of the positive active material, the conductive additive and the binder were 80:10:10. The slurry was coated on the Al foil current collector, after which was dried in vacuum for 12 hours to yield the electrode. The electrode was pressed and cut into a disc of 18 mm in diameter. A lithium foil was used for the negative electrode.

The positive electrode and the negative electrode were separated by the polypropylene film separator and placed inside the coin cell which was filled with an electrolytic solution of 1M Lithium hexafluro Phosphate ($LiPF_6$) dissolved in a solvent ethylene carbonate (EC)/diethylene carbonate (DEC) in the ratio of 1:1. The coin cells were subjected to charge discharge cycling at 0.05, 0.1 and 0.2 C rates for 50 cycles. The experiments were repeated for concordant results and typical examples are presented.

Figure 2:
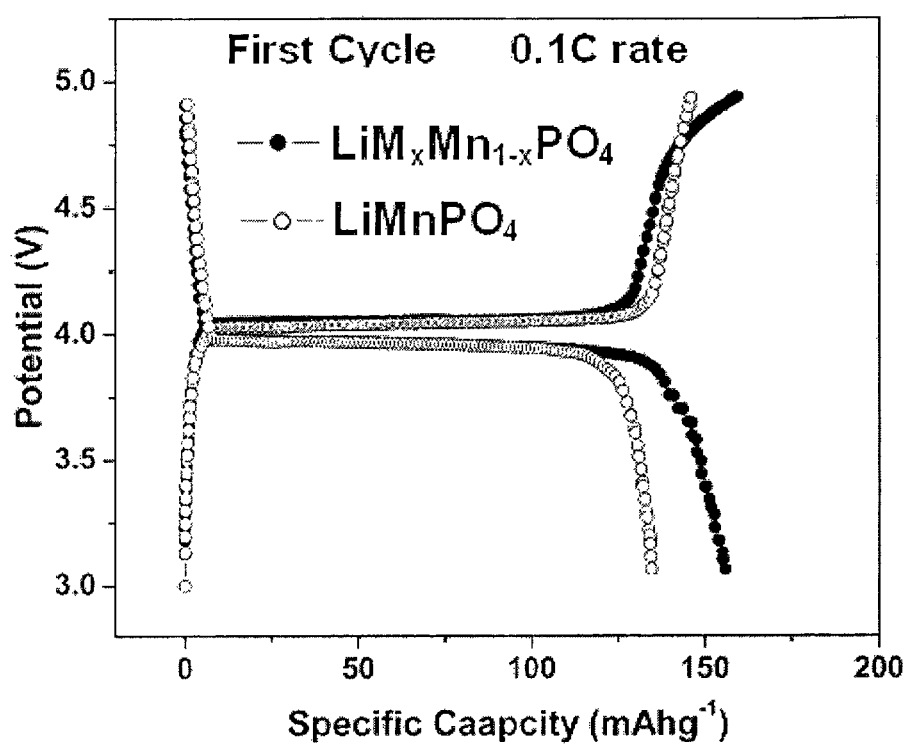
FIG. 2 represents the first discharge/charge curves of $LiM_xMn_{1-x}PO_4/C$ composite material at 0.1 C rate.

FIG. 1 shows the TEM image of $LiM_xMn_{1-x}PO_4/C$ clearly shows that the particles are present as agglomerated clusters with average size of the primary particles are about 100 nm and the carbon particles are appeared as coating layers over the $LiM_xMn_{1-x}PO_4$ particles. FIG. 2 shows the initial discharge curves of example 1 and 2 at 0.1 C rate when cycled between 3-4.9V. Initial discharge capacity of the undoped composite $LiMnPO_4/C$ is 133 mAhg$^{-1}$ at 0.1 C rate. Approximately 85% of the total capacity obtained in the plateau at 4.1 V corresponds to the redox reaction of $Mn^{3+}/Mn^{2+}$ coupled with the lithium intercalation/deintercalation into the olivine structure. Like pristine/C composites, $LiM_xMn_{1-x}PO_4/C$ composite delivers 160 mAhg$^{-1}$ at 0.1 C rate. The slightly poor performance of the $LiMnPO_4/C$ material is due to the excess $Mn^{2+}$ occupancy in Li sites. These $Mn^{2+}$ ions would act as an obstruction in the one dimensional transport pathway and hinder Li ion diffusion and eventually reduce the capacity. This is overcome by the dopant $Co^{2+}$ ions which eventually support the partially displaced $Mn^{2+}$ ions and also sustain the co-existence of $Mn^{2+}$ and $Mn^{3+}$ during the charge/discharge process. The high capacity delivered by carbon-coated materials should be attributed to the electronic conductivity of the materials enhanced due to conductive carbon network coated over the materials. Since the individual active particles are connected by carbon network, the active materials are fully utilized for lithium extraction and insertion reactions.

Figure 3:
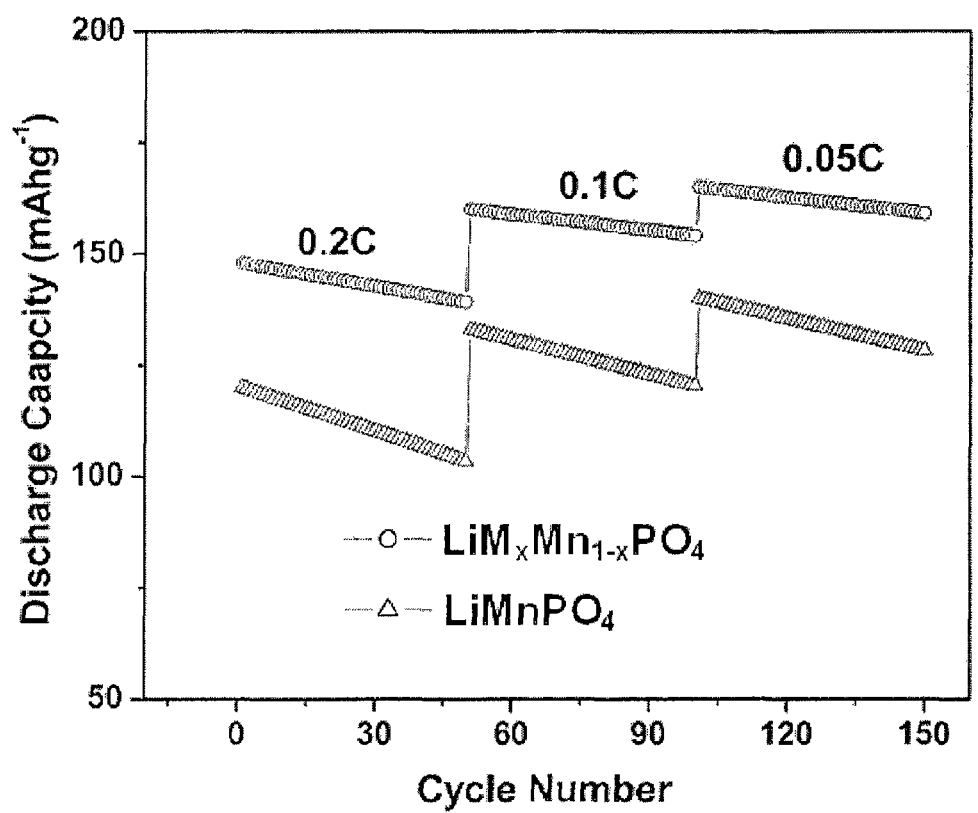
FIG. 3 represents the cycle number Vs discharge capacity curves of $LiM_xMn_{1-x}PO_4/C$ composites at different C-rates.

FIG. 3 shows the variation of discharge capacity with the number of cycles of $LiMnPO_4/C$ and $LiM_xMn_{1-x}PO_4/C$ composites carried out at different C rates (0.05, 0.1 and 0.2 C). Composites exhibit good cycling performance compared to its pristine. At the end of $50^{th}$ cycle $LiMnPO_4/C$ and $LiM_xMn_{1-x}PO_4/C$ retain the initial capacity of 90.2% and 96.25% respectively at 0.1 C rate. The capacity fade of the $LiM_xMn_{1-x}PO_4/C$ composite at 0.05 C rate is almost negligible, 93.9% capacity retention obtained at 0.2 C

| Discharge capacity (mAh/g) at 0.05 C rate | Discharge capacity (mAh/g) at 0.1 C rate | Discharge capacity (mAh/g) at 0.2 C rate |
|---|---|---| rate after 50 cycles. This excellent cycling stability can be achieved due to doping of transition metal cation which improves the diffusion character due to the enlargement of the crystal lattice and carbon network increase the electronic conductivity between the active particles.

| | $1^{st}$ Cycle | $50^{th}$ Cycle | Capacity retention (%) | $1^{st}$ Cycle | $50^{th}$ Cycle | Capacity retention (%) | $1^{st}$ Cycle | $50^{th}$ Cycle | Capacity retention (%) |
|---|---|---|---|---|---|---|---|---|---|
| $LiMnPO_4/C$ | 140 | 128 | 91.42 | 133 | 123 | 90.2 | 120 | 103 | 85.8 |
| $LiM_xMn_{1-x}PO_4/C$ | 165 | 160 | 97 | 160 | 154 | 96.25 | 148 | 139 | 93.9 |

Advantages of the Invention

The main advantages of the present invention are
Ease of synthesis as it obviates the need of inert atmosphere for the preparation of the carbon composites.
Excellent cycleability and reversibility at high voltages.
Very low irreversible capacity.

We claim:

1. A method to produce a nano composite cathode material having the formula, $LiM_xMn_{1-x}PO_4/C$, capable of cycling up to 4.9V, wherein M is a transition metal cation dopant and x varies from greater than 0 to 0.12 for lithium ion batteries comprising:
   a. mixing salts of acetates or nitrates of lithium, manganese, dopant and ammonium dihydrogen orthophosphate in the weight ratio ranging between 4.1:9.8:0:4.6 to 4.1:8.8:1:4.6;
   b. dissolving the mixture as obtained in step (a) in water in the weight ratio of 1:1 at temperature in the range of 27–30° C.;
   c. adding the solution as obtained in step (b) in glycine in the weight ratio of 1:1;
   d. heating the solution as obtained in step (c) for period in the range of 10 to 12 hrs at temperature in the range of 100-120° C.;
   e. grinding and calcining the mixture as obtained in step (d) at temperature in the range of 800-850° C. for period in the range of 4 to 5 hrs in air atmosphere;
   f. ball milling the calcined powders as obtained in step (e) with 30 wt % of acetylene black carbon to obtain nano composite cathode material capable of cycling up to 4.9V;
      wherein said material is prepared without involving inert environment during calcination; and
      wherein the dopants are selected from either Co or Ni.

2. The method to produce a nano composite cathode material according to claim 1, wherein dopant provides high capacity and cycling stability up to 4.9 V.

3. The method to produce a nano composite cathode material according to claim 1, wherein said cathode material is capable of delivering a discharge capacity in the range of 139 to 165 mAh/g at 0.2 to 0.05 C rate.

4. The method to produce a nano composite cathode material according to claim 1, wherein said cathode material is capable of high retention of capacity in the range of 95-98% at high rates up to 40 to 50 cycles when cycled up to 4.9V.

5. A method to produce a nano composite cathode material having the formula, $LiM_xMn_{1-x}PO_4/C$, capable of cycling up to 4.9V, wherein M is a transition metal cation dopant and x varies from greater than 0 to 0.12 for lithium ion batteries comprising:
   a. mixing salts of acetates or nitrates of lithium, manganese, dopant and ammonium dihydrogen orthophosphate in the weight ratio ranging between 4.1:9.8:0:4.6 to 4.1:8.8:1:4.6;
   b. dissolving the mixture as obtained in step (a) in water in the weight ratio of 1:1 at temperature in the range of 27-30° C.;
   c. adding the solution as obtained in step (b) in glycine in the weight ratio of 1:1;
   d. heating the solution as obtained in step (c) for period in the range of 10 to 12 hrs at temperature in the range of 100-120° C.;
   e. grinding and calcining the mixture as obtained in step (d) at temperature in the range of 800-850° C. for period in the range of 4 to 5 hrs in air atmosphere;
   f. ball milling the calcined powders as obtained in step (e) with acetylene black carbon to obtain nano composite cathode material.

6. The method to produce a nano composite cathode material according to claim 5, wherein the dopants are selected from either Co or Ni.

7. The method to produce a nano composite cathode material according to claim 5, wherein the method does not involve inert environment during calcination.

8. The method to produce a nano composite cathode material according to claim 5, wherein the dopants are selected from either Co or Ni.

9. The method to produce a nano composite cathode material according to claim 5, wherein the method does not involve inert environment during calcination.

10. A method to produce a nano composite cathode material having the formula, $LiM_xMn_{1-x}PO_4/C$, capable of cycling up to 4.9V, wherein M is a transition metal cation dopant and x varies from greater than 0 to 0.12 for lithium ion batteries comprising:
- a. mixing salts of acetates or nitrates of lithium, manganese, dopant and ammonium dihydrogen orthophosphate in the weight ratio ranging between 4.1:9.8:0:4.6 to 4.1:8.8:1:4.6;
- b. dissolving the mixture as obtained in step (a) in water at temperature in the range of 27-30° C.;
- c. adding the solution as obtained in step (b) in glycine;
- d. heating the solution as obtained in step (c) for period in the range of 10 to 12 hrs at temperature in the range of 100-120° C.;
- e. grinding and calcining the mixture as obtained in step (d) at temperature in the range of 800-850° C. for period in the range of 4 to 5 hrs in air atmosphere;
- f. ball milling the calcined powders as obtained in step (e) with acetylene black carbon to obtain nano composite cathode material.

* * * * *